United States Patent [19]

Popp

[11] 4,079,753
[45] Mar. 21, 1978

[54] ELECTRICALLY RESPONSIVE STATIC-PRESSURE REGULATING VALVE

[75] Inventor: Roger C. Popp, Chesaning, Mich.

[73] Assignee: Midland-Ross Corporation, Cleveland, Ohio

[21] Appl. No.: 726,978

[22] Filed: Sep. 27, 1976

[51] Int. Cl.² .............................................. F16K 11/16
[52] U.S. Cl. ................................................. 137/627.5
[58] Field of Search ........................... 137/627.5; 303/7

[56] References Cited

U.S. PATENT DOCUMENTS

| 2,927,608 | 3/1960 | Jenkins et al. | 137/627.5 |
| 3,151,914 | 10/1964 | Stelzer | 137/627.5 X |
| 3,605,813 | 9/1971 | Nakano et al. | 137/627.5 |

*Primary Examiner*—Robert G. Nilson

*Attorney, Agent, or Firm*—Woodrow W. Portz

[57] ABSTRACT

Disclosed is a solenoid valve which is useful essentially as a control device for pressure-actuated equipment which responds proportionally to an electric signal transmitted to the valve in accordance with the strength thereof. The valve functions in perhaps its most important utilization to maintain a static pressure which may be varied in accordance with the strength of the current supplied to the solenoid of the valve. The valve is constructed for operation by which an output pressure is modulated, according to the current strength of the solenoid, between two supply pressures admitted to separate portions of the valve. One supply pressure is lesser and the other is greater than generally contemplated output pressure.

9 Claims, 3 Drawing Figures

ELECTRICALLY RESPONSIVE STATIC-PRESSURE REGULATING VALVE

BACKGROUND OF THE INVENTION

In remotely controlling servo-motor mechanisms, there is a distinct need for control devices that are responsive to an electrical current varied according to a pattern determined at a control station and used to control remotely located mechanisms. For example, in the operation of a brake system of one vehicle connected with another having an operator's station, present technology provides satisfactory pressure-sensing transducers and transducer signal amplification equipment which can be located in the controlling vehicle but unsatisfactory equipment components responsive thereto for directly controlling a hydraulic braking system on the remotely controlled vehicle. This is merely one of many instances in which highly accurate, highly-responsive control action is needed in the translation of electrical signals of varying strengths into the operation of remotely controlled servo-mechanisms.

It is a primary object of the invention to provide a control device in the form of a specially constructed solenoid valve for regulating the pressure in a statically pressured body in a manner proportional to the energy input of the solenoid. Another object anallary to the above object is to obtain output pressures of the valve which may vary over any range between a supply pressure greater and a supply pressure lesser than the pressures of such range. Another object anallary of the foregoing object is to obtain modulated output pressures which are accurately correlated with the strength of the current for energizing the solenoid through the use of frictionless mechanism. It is also an object to provide a valve design enabling the manufacturing of parts of the valve within generous dimensional tolerance levels to achieve low manufacturing expense. A further object is to utilize spring mechanism within the valve which is insensitive to temperature changes and permits the use of springs manufactured to spring rates within generous tolerances. Still another object is to match a spring mechanism with the solenoid mechanism in such a way as to balance off a solenoid plunger rate with the spring rate of the spring mechanism and thus enable the modulation rate of the valve to be proportional in a high degree to the strength of the electrical current imposed on the coil of the solenoid.

SUMMARY OF THE INVENTION

The valve of this invention is designed essentially as a control device for pressure operated equipment functioning to provide an output pressure involving minor output volumes of gas. The valve is especially designed to provide pressure to a dead end or closed fluid receptacle of a pressure-controlled device and to provide the output pressure generally lower than a higher supply pressure but generally greater than another lower supply pressure. For example, the higher supply pressure may be at atmospheric level and the lower supply pressure at a subatmospheric level, such as the intake manifold vacuum obtained in automobile engine operation.

As to form, the valve comprises a solenoid having a central plunger, and a valve assembly which has a series of chambers in tandem axial arrangement which comprises a housing fixed to the solenoid having a first chamber and an inlet therefor adapted to be connected with the lower of the supply pressures. The housing further defines a second control chamber and an outlet port therefor which connects with the pressure-operated device to be controlled by the valve. The valve has a third chamber and an inlet port therefor adapted for connection with the source of the higher of the supply pressures, e.g., the atmosphere. The housing defines an annular valve seat located at the end of the third chamber nearer the solenoid but facing away therefrom through which the second and third chambers are communicable.

The valve assembly further comprises a valve member supported in the third chamber for reciprocation toward and away from the seat with which it is normally engaged. The valve member provides a hollow cylindrical portion extending from its disc portion in a direction away from the solenoid is slidable relation with a hollow cylindrical portion of the valve assembly which together define a fourth chamber. The fourth chamber is communicable through an aperture in the disc portion of the valve member with the second chamber. A spring or other resilient means, preferably contained within the fourth chamber, urges the member toward its seat. The valve assembly also includes a spool in axial tandem connected relation with the solenoid plunger which is reciprocably supported within the first and second chambers normally in spaced relationship with the valve member but engageable therewith to unseat the member and allow passage of high pressure supply fluid from the third chamber into the second chamber through the valve seat. A flexible diaphragm in concentric relation with the spool is connected in sealed relation with the spool and the housing and serves as a flexible wall for separating the first and second chambers. The spool has an open end remote from the solenoid plunger and a central passageway which extends from a lateral opening in the spool and then axially through the spool to the open end.

Separate springs are seated in the housing to act toward each other and have their adjacent ends seated on the spool with their remote ends seated on the housing to axially urge the spool to a neutral position corresponding to equal pressures in the first and second chambers with the open end of the spool in spaced relation with the valve member when the solenoid is deenergized and the valve member is in its seated position. The arrangement of the springs results in spring rates which neutralize the accelerating increase of force exerted by the solenoid plunger as it reaches fully activated position. When electrical activation of the solenoid occurs, the plunger carries the spool toward the valve member and then unseats the valve member while closing off its end which engages the valve member. The result is to terminate communication of the first chamber with the second chamber and to enable passage of fluid from the third chamber to the second chamber.

The valve is substantially devoid of friction generated areas which would contribute to hysteresis in the operation of the valve. However, an intended hysteresis pattern is designed into the valve to provide low hysteresis at low solenoid activation through the communication of the fourth chamber with the third chamber provided as above indicated and a pressure unbalance on the valve member which occurs at its opposite sides when its spool engages the valve member.

DESCRIPTION OF A PREFERRED EMBODIMENT

Figure 1:
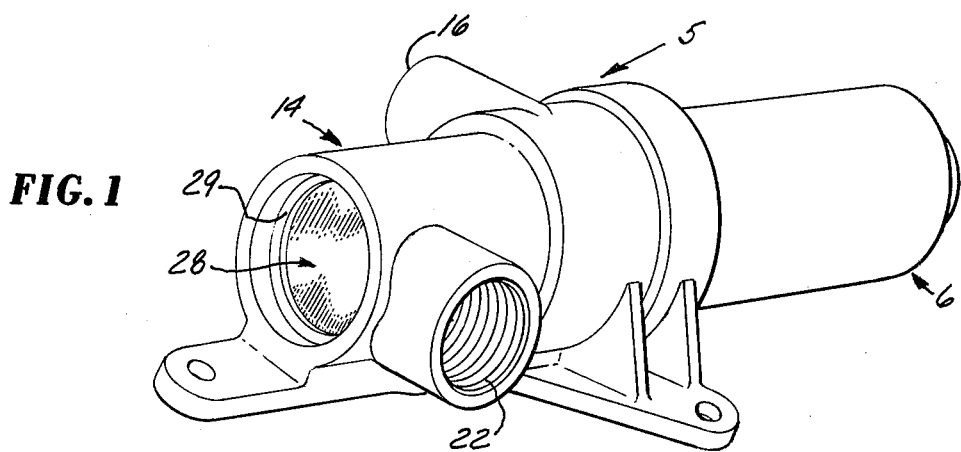
FIG. 1 is a perspective view of a solenoid valve in accordance with the invention.

The solenoid valve 5 shown in the drawing comprises as major portions, a solenoid 6 and a valve assembly 7. The solenoid comprises a coil 9 and a reciprocable plunger 10. The valve assembly comprises a housing 14 which encloses, in the order numbered proceeding in a direction away from the solenoid, a first or low pressure chamber 15 having an inlet port 16 connected with a low pressure source 17, a second or central chamber 18 having an outlet port 19 connected, e.g., with a pressure-actuated device 20, such as a brake booster unit, and a third or high pressure chamber 21 having an inlet port 22 therefor for admitting relatively high pressure fluid into the third chamber. The third chamber terminates at the end nearer the second chamber in an annular valve seat 23 through which the second and third chambers are communicable.

The valve assembly 7 further includes a cup-like valve member 25 slidably supported by a cylindrical boss 26 within the third chamber 21 for engagement with, or reciprocation toward and away from, the valve seat 23. The boss 26 is a portion of a plug 28 which is secured by a lock ring 29 within the end of the housing 14. The boss has an outer cylindrical surface generally complimentary to the inner surface 31 of a cylindrical flange of the valve member 25. The cylindrical surfaces are of sufficient length to provide sufficient range of reciprocation of the member relative to the boss during all conditions of operation of the valve. The boss 26 is hollow to provide a cylindrical recess 32 for receiving a compression spring 33 seated within the boss and on the inner surface of the member 25 to urge the member against the seat 23. To enhance sealed relationship of the member 25 in the seat 23, the member comprises a disc-shaped resilient element 35 inlaid into its flat circular end surface 36.

The valve assembly 7 also includes a spool 40 connected with the plunger 10 by a link 41 with all three pieces in generally coaxial tandem relationship whereby they may move as a unit in an axial direction toward the third chamber. On sufficient excitation, these pieces move through a full stroke until the male conical surface 42 of the plunger engages the recessed mating conical surface 43 of the solenoid magnetizable field piece 48 as a stop.

Figure 2:
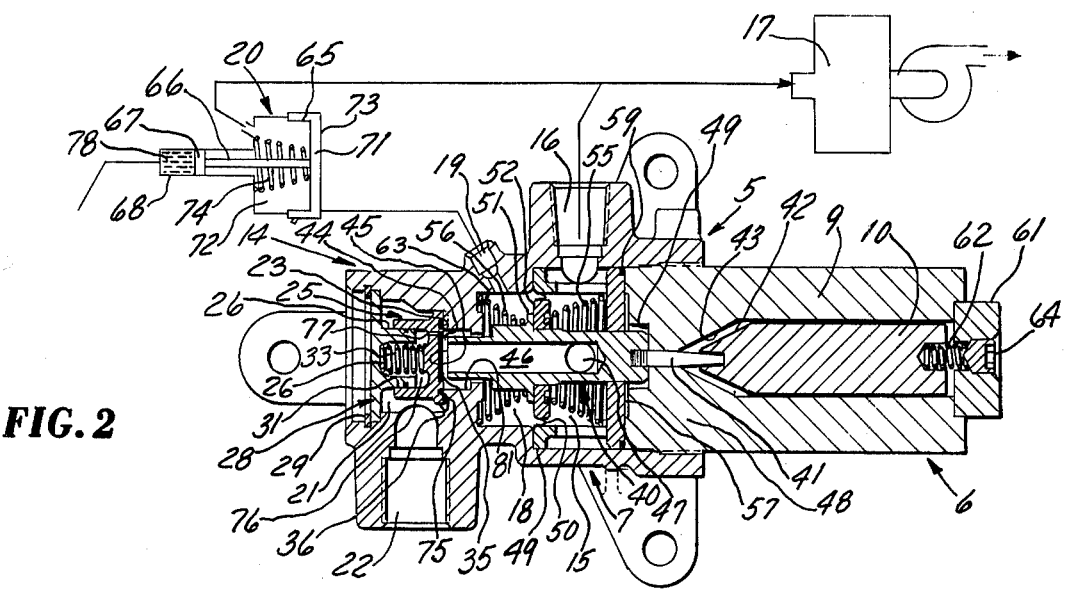
FIG. 2 is a view in section taken along the axis of the solenoid and the valve assembly of the valve of FIG. 1 shown with connections thereof with a low pressure source and a control device indicated diagrammatically.

As shown in FIG. 2, a gap 44 exists between the seated member 25 and the end of the spool 40 at inactive condition of the valve. This gap is closed by a slight activation of the solenoid and travel of the spool-plunger link unit through about 50 percent of its full stroke. With sufficient additional activation of the solenoid, the valve member 25 is pushed away from its seat 23. The spool has a central bore 46 extending from a lateral aperture 47 of the spool to its open end at end surface 45 which enables fluid communication between the first chamber 15 and the second chamber 18 when the spool is disengaged from the valve member 25. A recessed surface 49 of the field piece 48 functions as a stop for terminating retroactive movements of the spool 40.

To otherwise seal the first chamber from the second chamber, the valve assembly further comprises a diaphragm 50 sandwiched along its outer circumferential edge between a housing shoulder and a cylindrical collar 49 bearing thereagainst. The inner circumferential edge of the diaphragm 50 is sandwiched between a flange 51 of the spool and an annular spring seat 52 bearing thereagainst. The diaphragm thus functions as a sealed flexible wall which separates the first chamber 15 from the second chamber 18.

The valve assembly 7 further comprises springs 55, 56 which are seated in the housing to act toward each other on the spool to axially urge the spool to a neutral position corresponding to equal pressures in the first and second chambers resulting from a deenergized state of the solenoid. A retainer ring 57 positioned axially against the collar 49 by bearing engagement of an end surface of the solenoid element 48 provides a fixed seat for the spring 55. The solenoid is shown as threaded relation with the housing 14 and may be screwed tightly against the retainer ring 57. The interior of the valve assembly is sealed by an O-ring 59 and a plug 61 detachably fixed to the outer end of solenoid coil structure for entrapping the plunger 10. A spring 62 stands between the plug 61 and the plunger to maintain non-resilient and slack-free engagement of the plunger-link-spool assembly as shown in FIG. 2 so that the plunger 10 may push the spool 40 without any lost motion. The spring 56 is confined between the spool flange 51 and an internal annular recessed housing surface 63. Springs 55, 56 are balanced to return the assembly of the plunger, link 41, and the spool to a neutral position.

Since the springs 55, 56 are preferably mounted as substantially-matching or identical pairs, in opposition, their sensitivity to temperature tolerances in manufacture etc. tend to cancel each other in the operation of the valve. Their rates are also cumulative in opposing the solenoid rate of closure as a consequence of the springs 55, 56 being supported at the neutral position of the spool in a suitable state of precompression to enable the springs to be in a state of compression between respective seats of each spring at all positions of the plunger 10.

Since the valve 5 is subject to many variations in structure, such as in dimensions of parts and apertures, strength of springs, solenoid performance etc., means is needed to calibrate each valve to nearly standard performance. Calibration is achieved in a practical way by adjustment of the compression in the spring 62. Accordingly, the plug 61 provides a threaded bore which receives a set screw 64 in tandem relation with the spring which positioned axially for the plug bore for varying the force of spring 62 on the plunger 10. Such adjustment has the effect of varying the minimum electrical current through the solenoid which cause an output pressure of the valve, i.e., the locating of point A along X—X axis of FIG. 3.

The operation of the valve may be considered in respect to a typical use, i.e., the operation of a brake booster such as the device 20 shown. In this instance, the booster comprises a flexible diaphragm 65 connected with a piston rod 66. The piston rod actuates piston 67 of a hydraulic cylinder 68. Chambers 71, 72 are normally maintained at the same pressure but the diaphragm piston rod and piston assembly are urged toward booster wall 73 by a spring 74. Obviously, if pressure is increased in chamber 71 or decreased in chamber 72 the diaphragm 65 will move against the spring 74 to operate the hydraulic piston and cylinder unit.

In the inactive state of the booster 20, the various movable components of the solenoid valve are in the positions illustrated by FIG. 2, i.e., the neutral state of the valve. The neutral state of the valve is obtained, e.g., by application of subatmospheric pressure to the chamber 15 of the valve and chamber 72 of the pressure responsive servo device 20 by the vacuum producing system 17. Equal vacuum pressure thus exists in chambers 15 and 72. Because first chamber 15 can communicate with second chamber 18 through the bore of the spool, equal pressure also exists in chamber 18 as well as chamber 71 of the device 20. Assuming port 22 is open to the atmosphere, the pressure in the third chamber 21 is at an ambient value.

If the coil 9 of the solenoid is now energized with a current sufficient to advance the assembly of plunger 10, link 41, and spool 40 toward the member 25, the member 25 is engaged and unseated from seat 23 to allow some air to flow from the third chamber 21 into the second chamber 18 and to the chamber 71 of device 20. Assuming the current for energizing the solenoid is at a low value, merely enough air will flow from chamber 21 to chamber 18 to counteract the relatively low thrust on the spool 40 and cause it to retract and seat the valve member 25. Thus an equilibrium condition is established by the pressure within the second chamber 18 and the thrust of the solenoid plunger as produced by a low value current. Meanwhile the device 20 has reacted in a similar manner through the increase in pressure within chamber 71 causing an equilibrium position of the diaphragm 65 to be reached as a result of the increase of pressure in chamber 71, the change of position of the diaphragm, and an increase in the opposition of the spring 74 and, mainly, an increased hydraulic pressure within the fluid 98 in cylinder 68.

Assume now a greater current passes through the solenoid coil to increase the thrust of the plunger 10 and the transmission of such thrust by the spool against the valve member 25. In response to the greater thrust, the valve member 25 is again unseated to allow more air to enter the second chamber 18 to establish a new equilibrium of greater pressure versus greater solenoid thrust within the valve and the transmission of more pressure to the chamber 71 of the device 20. A new equilibrium is established in the device 20 resulting in more thrust on the piston 67 of the cylinder piston assembly of the device 20. In this manner infinite variation within a desired range can be achieved in a proportional pattern in accordance with the strength of electric current passed through the solenoid coil.

As hereinbefore indicated, the rates of springs 55, 56 are approximately matched with the mechanical rate of plunger closure of the solenoid. That is to say, the springs are selected in a manner to overcome the geometric increase in the strength of the solenoid as the plunger approaches closure of the gap between surfaces 42 and 43. Thus, the net effort of the spool 40 is approximately proportional to the strength of the current at any instant used to energize the coil of the solenoid.

Figure 3:
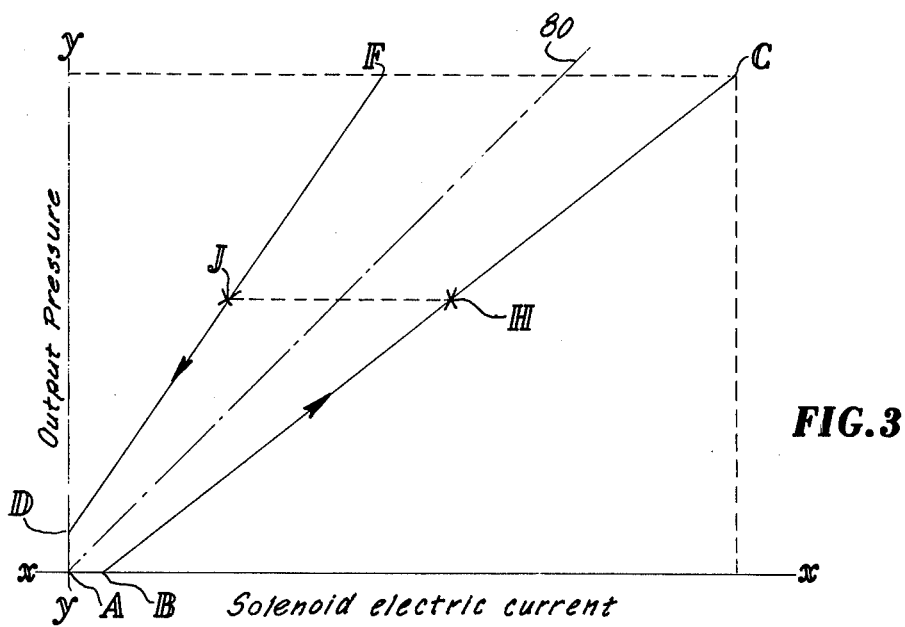
FIG. 3 is a graph which depicts curves which compare ideal hysteresis-free valve operation with the hysteresis affected operation of a valve adopted in accordance with this invention.

In any valve designed to provide an output pressure at some level between two supply pressures received by the valve, operation is affected by what is termed "hysteresis" due to friction of the valve parts and the interaction of upper and lower supply pressures and the control or output pressure on the various valve parts. In practice, it is impossible to obtain operation of a solenoid valve which responds in the ideal sense with identical output pressures at the same excitation or energy input of the solenoid regardless of whether the valve is operated on an ascending pressure basis or a descending basis. In a graphical sense, the ideal performance of a valve is illustrated in FIG. 3 by the substantially straight line dot-dash curve 80 along which solenoid current values measured along the axis X—X correspond to output or control pressures measured along the axis Y—Y.

While some discretion is available to the valve designer in the choice of hysteresis patterns, the present valve is especially designed for low hysteresis at low solenoid excitations and correspondingly low output pressures, where hysteresis is most detrimental to proper valve function, at the expense of larger hysteresis values at higher solenoid excitations and correspondingly higher output pressures.

Accordingly, the hysteresis pattern of the present valve is illustrated in principle by curve ABC which represents corresponding current-pressure values while the valve is subjected to progressively increasing solenoid action corresponding, e.g., in a power brake system to brake application. Curve FDA corresponds to current-pressure values when the valve is subjected to decreasing solenoid action, such as experienced in releasing the brake system. The portion AB of curve ABC represents the excitation of the solenoid required to move the plunger 10 and the spool 40 to a point of lifting the valve member 25 from its seat 23. Portion DA of curve FDA represents the action of the various valve springs in the absence of any excitation of the solenoid in restoring the valve to its neutral position as shown in FIG. 2.

Typically, a medium manual control effort in the application phase would affect, e.g., solenoid operation and corresponding increases in output pressure to point H on the curve ABC; release operation would involve a drop in solenoid excitation with no drop in output pressure along the line HJ until the point J was reached on the "release" curve FDA. Further release operation will cause current values in the solenoid to drop along line JD with corresponding drops in the output pressure of the valve, and finally the internal mechanism of the valve assembly would restore the valve to its neutral position along line DA once the solenoid is fully deenergized.

The hysteresis of the present valve is intentionally provided in its operation by an arrangement of parts which causes balancing and unbalancing of pressures exerted at the opposite sides of the valve member 25. It should be noted that the diameter of the cylindrical surface 81 of the second chamber 18 is the same as the inner surface 31 of the cylindrical flange of the valve member 25. When the spool 40 is separated from the valve member, the fourth chamber 32 is at the same pressure as the second chamber because of an aperture 77 which extends through this portion of the valve member. This balanced pressure relationship changes, however, as soon as the spool seats on the valve member 25. When this happens, the side of the valve member within the fourth chamber 32 is subjected to greater pressure than the side of member 25 facing toward the spool since the interior of the spool is subjected to the lower supply pressure communicated from the first chamber 15.

Such an arrangement has the affect of increasing the solenoid effort necessary to unseat the valve member during an "application" operation along curve ABC. Increasingly higher "application" causes greater differences between the first and fourth chamber pressures and hence greater deviation from the ideal behavior of curve 50. The hysteresis of the present invention is approximately proportional to the output pressure of the valve. For the same reason, the effort of unseating the spool from the valve member 25 during release operation is increased in "release" operation along curve FDA. Hence, compensation in obtaining "release" operation as compared with ideal operation along curve 50, is made by greater than ideal drops in solenoid excitation to produce retractions of the spool from the valve member.

What is claimed is:

1. A solenoid valve comprising a solenoid and a valve assembly attached thereto for supplying a fluid at an output pressure between a higher input pressure and a lower input pressure and proportional to an electric current passed through the coil of the solenoid, said solenoid comprising a central plunger and said valve assembly comprising:

a housing enclosing in the order named proceeding in a direction away from said solenoid, a first chamber and an inlet port therefor for said lower pressure fluid, a second control chamber and an outlet port therefor, a third chamber and an inlet port therefor for said higher pressure fluid, and an annular valve seat located at the end of the third chamber nearer the solenoid and facing away therefrom, said second and third chambers being communicable through said seat;

a valve member supported in said third chamber for reciprocation toward and away from said seat and being normally engaged with the seat;

resilient means for urging said member toward said seat;

a spool in axial tandem connected relation with said plunger and reciprocably supported within said first and second chambers;

sealing means in concentric sealing relation with the spool and the housing for separating the first and second chambers;

said spool having an open end remote from said plunger and a central passageway extending from an opening of the spool in said first chamber to said open end;

separate substantially-matching spring means seated in said housing acting toward each other on said spool to axially urge the spool to a neutral position corresponding to equal pressures in the first and second chambers with said open end in spaced relation with said member when said solenoid is deenergized and said member is in seated position;

said spool being directly connected in slack-free non-resilient relation with said plunger to engage said member and carry it without any lost motion to a position spaced from said seat with said member closing off said open end to enable passage of fluid from said third chamber to said second chamber.

2. The solenoid valve of claim 1 comprising:

means outside the diameter of said open end providing fluid communication from the side of said member facing toward said second chamber and a second side of the member facing away from the second chamber; and means enclosing said second side of the member from the atmosphere.

3. The solenoid valve of claim 1 comprising:

a hollow cylindrical boss in said third chamber extending from an end wall of the housing toward said second chamber;

said member being cup-shaped to provide a cylindrical flange of which a cylindrical surface thereof extends in axially overlapping relation with a cylindrical surface of said boss;

sealing means acting between said overlapping cylindrical surfaces;

said member having a passageway extending from a portion of its spool engaging surfaces outside the diameter of the spool to a surface thereof facing into a region enclosed from the atmosphere by said overlapping cylindrical surfaces of the boss and the member flange.

4. The solenoid valve of claim 1 wherein:

a portion of said second chamber adjacent said valve seat is defined by a cylindrical surface in concentric outward relation with the portion of the spool extending therethrough;

said housing comprising an end wall having a hollow cylindrical boss in coaxial relation with said cylindrical surface and its outer cylindrical surface of the same diameter as said cylindrical surface of the second chamber;

said member having an annular flange providing an interior cylindrical surface in close fitting axially overlapping relation with said outer surface of the boss;

said member having an aperture therethrough from a portion of its surface facing toward said second chamber in outward relation with the diameter of the adjacent end of the spool to a surface facing interiorly of the region enclosed by said flange and said boss.

5. The solenoid valve of claim 1 wherein:

said second spring means are tapered compression springs of similar and equal configuration and the seats therefor in fixed relation with the housing are coaxial and of lateral as well as axial confining relation with the portions of the springs engaged thereby to receive the larger ends of the springs;

oppositely facing coaxial seat means supported on the spool for receiving the smaller ends of said springs.

6. The solenoid valve of claim 1 comprising:

means sealing the end of the solenoid outward from said housing; and means sealing the connection of the solenoid with the housing.

7. The solenoid valve of claim 1 comprising:

link means connecting the plunger and the spool of substantially less cross section than the plunger or the spool;

said solenoid having a pole piece securing said solenoid to the housing and providing an aperture generally coaxially with said plunger and spool and of a diameter providing loose slidable relation of the link means;

said pole piece being constructed and arranged at opposite ends of said aperture to function as stop means for said plunger and said spool.

8. The solenoid valve of claim 1 has solenoid coil structure and comprises:

means for calibrating the valve to desired performance values comprising resilient means operatively positioned between the plunger and said solenoid coil structure for urging said plunger toward said member; and adjustable means acting on said resilient means to vary the force of said resilient means on said plunger.

9. The solenoid valve of claim 8 wherein:

resilient means is a compression spring and said adjustable means is a set screw in tandem relation with the spring.

* * * * *